US011506490B2

(12) United States Patent
Bruckdorfer

(10) Patent No.: US 11,506,490 B2
(45) Date of Patent: Nov. 22, 2022

(54) METHOD AND COMPUTER PROGRAM PRODUCT FOR FILTERING A MEASUREMENT DATA SET USABLE FOR SPECIFYING AND/OR VERIFYING AN INTERNAL FEATURE OF A WORKPIECE

(71) Applicants: MITUTOYO CORPORATION, Kanagawa (JP); Mitutoyo Europe GmbH, Neuss (DE)

(72) Inventor: Till Martin Bruckdorfer, Schramberg (DE)

(73) Assignees: MITUTOYO CORPORATION, Kanagawa (JP); MITUTOYO EUROPE GMBH, Neuss (DE)

( * ) Notice: Subject to any disclaimer, the term of this patent is extended or adjusted under 35 U.S.C. 154(b) by 37 days.

(21) Appl. No.: 17/349,300

(22) Filed: Jun. 16, 2021

(65) Prior Publication Data

US 2021/0404802 A1    Dec. 30, 2021

(30) Foreign Application Priority Data

Jun. 30, 2020  (EP) .................................... 20183044

(51) Int. Cl.
  G01B 21/30  (2006.01)
(52) U.S. Cl.
  CPC .................... G01B 21/30 (2013.01)
(58) Field of Classification Search
  CPC ........ G01B 21/30; G01B 21/14; G06K 9/623; G06K 9/6215
  See application file for complete search history.

(56) References Cited

U.S. PATENT DOCUMENTS 4,888,693 A * 12/1989 Tam .......................... A61B 6/08
  378/4
8,693,288 B1 * 4/2014 O'Brien, Jr. ........... G06V 10/30
  367/135

(Continued)

FOREIGN PATENT DOCUMENTS

WO    2013/030764 A1    3/2013
WO    2015/016888 A1    2/2015

OTHER PUBLICATIONS

Vincze, M. et al., "Efficient borehole detection from single scan data", Machine Vision and Applications, vol. 21, Jul. 7, 2009, pp. 825-840.

*Primary Examiner* — Tung S Lau
(74) *Attorney, Agent, or Firm* — Greenblum & Bernstein, P.L.C.

(57) ABSTRACT

A method for filtering a measurement data set usable for specifying and/or verifying an internal feature of a workpiece, the method includes providing a measurement data set comprising a plurality of measurement points of the internal feature; providing an auxiliary feature representing an ideal estimate for the internal feature of the workpiece; mirroring each measurement point of the measurement data set on a boundary element of the auxiliary feature, thereby generating a first modified data set comprising a plurality of first modified measurement points; determining a convex hull of the first modified measurement points and projecting the first modified measurement points onto the determined convex hull, thereby generating a second modified data set comprising a plurality of second modified measurement points; and mirroring each second modified measurement point on the boundary element of the auxiliary feature, thereby generating a filtered measurement data set comprising a plurality of filtered measurement points.

13 Claims, 6 Drawing Sheets

(56) References Cited

U.S. PATENT DOCUMENTS

| | | | |
|---|---|---|---|
| 9,600,765 B1* | 3/2017 | Pedersen | G06N 5/02 |
| 10,311,328 B2* | 6/2019 | Morovic | G06V 10/56 |
| 11,420,647 B2* | 8/2022 | Wyffels | B60W 60/001 |
| 2013/0030773 A1 | 1/2013 | O'Hare | |
| 2015/0149142 A1* | 5/2015 | Li | G01V 99/005 703/10 |
| 2017/0213102 A1* | 7/2017 | Morovic | G06V 10/56 |
| 2019/0004166 A1* | 1/2019 | Orlowski | G01S 13/58 |
| 2020/0410728 A1* | 12/2020 | Chen | G06V 10/44 |
| 2022/0204029 A1* | 6/2022 | Chen | G01S 17/42 |

* cited by examiner

Fig. 1a (State of the art)
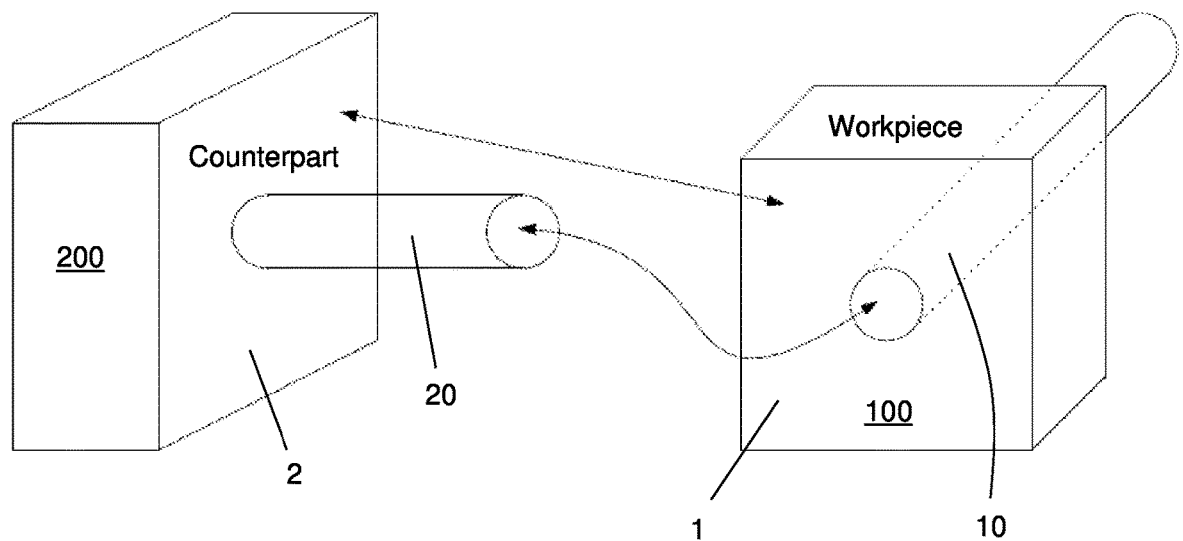
Fig. 1b (State of the art)
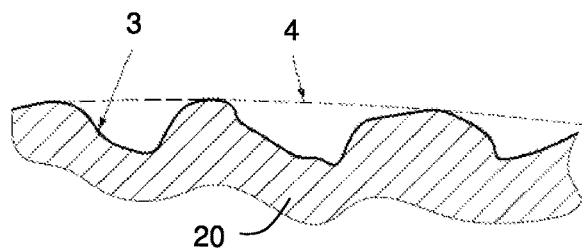
Fig. 1c (State of the art)
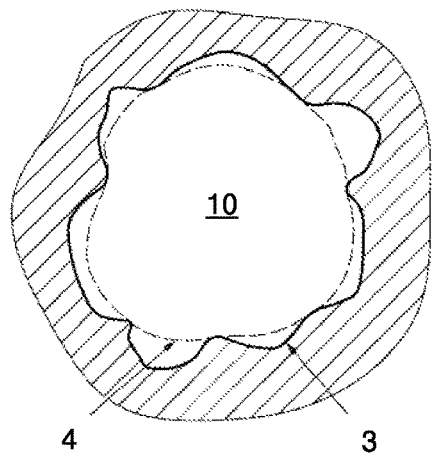

METHOD AND COMPUTER PROGRAM PRODUCT FOR FILTERING A MEASUREMENT DATA SET USABLE FOR SPECIFYING AND/OR VERIFYING AN INTERNAL FEATURE OF A WORKPIECE

CROSS-REFERENCE TO RELATED APPLICATIONS

The present application claims priority under 35 U.S.C. § 119 of European Application No. 20183044.5, filed on Jun. 30, 2020, the disclosure of which is expressly incorporated by reference herein in its entirety.

BACKGROUND OF THE INVENTION

1. Field of the Invention

The disclosure relates to a method for filtering a measurement data set which is usable for specifying and/or verifying an internal feature of a workpiece. Further, the present disclosure relates to a corresponding computer program product.

In metrology, an important task is to verify that a workpiece is manufactured according to the specification of the designer. Specifications are usually defined by CAD (computer-aided-design) models or drawings and are intended to describe the functional needs. Many specifications, like orientation or position tolerances, are defined with respect to reference features on the workpiece. These reference features are called "datums."

As an example: The functional need of a workpiece may be to assemble it with a counterpart. The workpiece may comprise a planar surface with a bore, and the counterpart of the workpiece may comprise a planar surface with a corresponding bolt. The planar surface of the counterpart with the bolt must fit to the corresponding bore and the planar surface of the workpiece. Thus, a functional demand for specification may be to characterize the planar surface of the workpiece to be perpendicular to the bore. In this case, the bore (being geometrically a cylinder) serves as datum.

In order to verify such a specification, the datum has to be measured with a measuring apparatus and the obtained measurement points have to be further processed. According to the current ISO 5459 standard (i.e. ISO 5459:2011), the obtained measurement points shall be used to determine an optimal geometry of the datum (e.g. an optimal cylinder). However, as any measurement method entails the probability that some measurement points are outliers and do not reflect the real surface, Appendix A of the ISO 5459:2011 standard requires that a filtration of the obtained measurement points is performed before determining or calculating the associated cylinder based on the measurement. But currently, the ISO 5459:2011 standard does not explicitly specify which filter is to be used.

For outer or external features (such as a bolt of a workpiece), it is known to filter the obtained measurement points by determining a convex hull of the measurement points and obtaining filtered measurement points by projecting the measurement points onto the determined convex hull. This procedure fulfills the following conditions required for filtering measurement data of outer features:

outliers to the inside of the feature should be eliminated, because they should have less influence on the datum association process;
outermost points should be kept, because these are the relevant points for calculation of the datum association; and
the filter should behave similar to a morphological filter, i.e., it should smoothen the deviations.

Thus, this known convex hull based filtration method qualifies as a candidate for a default filtering process with respect to outer features and is proposed for the new GPS ISO 5459 standard as default for preprocessing a datum calculation (association).

However, the requirements and/or conditions for filtering measurement points of inner or internal features (such as a bore of a workpiece) differ from those mentioned above with respect to outer features. In particular, for a method filtering measurement data of inner features, the following conditions have to be met in order be a candidate for a default filtering process:

outliers to the outside of the feature should be eliminated, because they should have less influence on the datum association process;
innermost points should be kept, because these are the relevant points for calculation the datum association; and
the filter should behave similar to a morphological filter, i.e., it should smoothen the deviations.

In view of the different conditions and/or requirements, the convex hull based filtration method proposed in view of outer features cannot be directly applied to inner features. Therefore, in view of inner features, currently the use of other completely different types of filter, particularly a morphological filter (e.g. a closing ball with some finite radius), are in discussion.

Thus, it is a problem to unify the filtration method for both inner and outer features. In particular, it is a problem to provide a convex hull based filtration method for inner features of a workpiece. This problem is solved by the subject-matter of the independent claims. Preferred embodiments are defined in the dependent claims.

SUMMARY OF THE INVENTION

According to one aspect of the present disclosure, a method for filtering a measurement data set usable for specifying and/or verifying an internal feature of a workpiece is provided. The method comprises the following steps:

providing a measurement data set comprising a plurality of measurement points of the internal feature;
providing an auxiliary feature which represents an ideal estimate for the internal feature of the workpiece;
mirroring each measurement point of the measurement data set on a boundary element of the auxiliary feature, thereby generating a first modified data set comprising a plurality of first modified measurement points;
determining a convex hull of the first modified measurement points and projecting the first modified measurement points onto the determined convex hull, thereby generating a second modified data set comprising a plurality of second modified measurement points; and
mirroring each second modified measurement point on the boundary element of the auxiliary feature, thereby generating a filtered measurement data set comprising a plurality of filtered measurement points.

The measurement data set may be obtained experimentally by means of a measuring apparatus. In particular, the measurement data set is obtained to be used for specifying and/or verifying an internal feature of an object or a workpiece.

Within the present disclosure, the term "feature" particularly refers to or means a geometry. An "internal feature" (herein also referred to as "inner feature") of a workpiece encompasses a void, an opening and/or a hollow space of the workpiece. In particular, an internal feature is the geometry of a cavity (such as a hole or bore) of the workpiece. The internal feature or cavity of the workpiece may be a datum, i.e., a reference feature, of the workpiece.

"Providing a measurement data set" may comprise obtaining, determining and/or capturing measurement data. The measurement data set of the internal feature comprises a plurality of measurement points of the internal feature. In particular, the measurement points comprise or are coordinates of measured points of the internal feature. The measured points may be surface or boundary points, i.e. points of a surface or a boundary of the internal feature of the workpiece. Depending on the internal feature, the coordinates may comprise or be 2D-coordinates and/or 3D-coordinates, i.e., the coordinates may relate to a two dimensional and/or a three dimensional coordinate system. The coordinate system may be predefined by the measuring apparatus that is used for obtaining the measurement data.

The measuring apparatus used for obtaining the measurement points may be a coordinate measuring device. The coordinate measuring device may be based, e.g., on a tactile, an optical and/or a computer tomography measurement.

"Providing an auxiliary feature" may comprise determining and/or calculating an auxiliary feature. The "auxiliary feature" may be a specified (i.e. predetermined or determinable) ideal feature or geometry. In particular, the "auxiliary feature" may be an ideal feature or a geometric element (that can be described and/or defined mathematically). The auxiliary feature may be, e.g., a circle, a sphere, a cylinder or a cone. These features have a radial parameter in common. In particular, the auxiliary feature is a least squares geometric element (e.g. a least squares circle, a least squares sphere, a least squares cylinder or a least squares cone), also referred to as "Gaussian element" or "Gaussian feature". In other words, "providing an auxiliary feature" may comprise providing auxiliary (ideal) geometry data of the internal feature of the workpiece. The auxiliary feature and/or the auxiliary geometry data represent an ideal estimate for the internal feature of the workpiece. An "ideal estimate" particularly means an ideal model with perfect form.

Each measurement point of the measurement data set is mirrored on a boundary element of the auxiliary feature. The boundary element of an n-dimensional auxiliary feature may generally be a hyperplane in the n-dimensional Euclidian space, wherein the hyperplane forms a boundary of the auxiliary feature. In particular, the boundary element of the auxiliary feature may be a boundary surface (also referred to as reflect surface), a boundary line (also referred to as reflect line) or a boundary point (also referred to as reflect point) of the auxiliary feature, although a boundary points is not a hyperplane, but derivable from a hyperplane. For example, in case that the auxiliary feature is a circle the boundary element may be the circular line of the circle, in case that the auxiliary feature is a sphere the boundary element may be the surface (or the curved surface area) of the sphere, in case that the auxiliary feature is a cylinder the boundary element may be the curved surface area of the cylinder, and in case that the auxiliary feature is a cone the boundary element may be the curved surface area of the cone.

By mirroring each measurement point of the measurement data set on a boundary element of the auxiliary feature, a first modified data set (i.e. a set of modified measurement points $\{P'\}$) is generated. Since the first modified data set comprises mirrored measurement data, it may be also referred to as mirrored measurement data set.

Based on the first modified data set, a convex hull is determined or calculated. In other words, a convex hull based on the mirrored measurement points is determined. Determining the convex hull means that a non-ambiguous and efficient representation of a required convex shape is constructed for a finite set of points (here the first modified data set). This is preferably done by computational means, i.e. by means of a microprocessor and/or computer. In particular, any suitable standard convex hull algorithm may be used within the present disclosure. For example, in the two- and three dimensional case, any one of the following well-known convex hull algorithms may be used: "Incremental brute force algorithm" (also known as "Gift wrapping" and in the two-dimensional case as "Jarvis march"), "Quickhull", "Divide and conquer", and "Chan's algorithm". Further, at least in the two-dimensional case, also any one of the following well-known convex hull algorithms may be used: "Monotone chain (also known as "Andrew's algorithm"), and "The ultimate planar convex hull algorithm". Since these and other algorithms for determining or computing the convex hull are well known in the art, they are not further described here. It is noted that the above lists are not exhaustive so that also any other suitable convex hull algorithm may be used within the present disclosure.

The points of the first modified data set are then projected onto the determined convex hull. In particular, each point of the first modified data set is projected onto the determined convex hull. By projecting the points of the first modified data set onto the determined convex hull, a second modified data set (i.e. a set of second modified measurement points $\{P''\}$ that have been projected onto the convex hull) is generated. The points $\{P''\}$ may be referred to as projected points, and the second modified data set may be referred to as the projected data set.

Each point of the second modified data set (i.e. each second modified measurement point) is then mirrored on the boundary element of the auxiliary feature. Thereby, a filtered measurement data set (also referred to as third modified data set) is generated. The filtered measurement data set is a set of filtered measurement points $\{P'''\}$ which are also referred to as third modified measurement points.

In particular, by the first mirroring step, measurement data of an internal feature of a workpiece is transformed to represent a corresponding virtual external feature of the workpiece. In particular, the first modified data set represents the corresponding virtual external feature of the workpiece. By the second mirroring step, the transformation (or first mirroring) is reversed. In other words, by the second mirroring step, data representing the virtual external feature is transformed or mirrored back to data representing the real internal feature of the workpiece.

In particular, the mirroring process (i.e. both the first mirroring step and the second mirroring step) comprises a transformation of measurement points with the property that outermost points become innermost points and vice versa. For this purpose, the auxiliary feature is used as "mirror". For example, in case that the auxiliary feature is a cylinder (e.g. a Gaussian cylinder), points inside/outside of the cylinder are moved to the outside/inside of the cylinder along an orthogonal direction with respect to the surface and/or the axis of the cylinder. In particular, the points are moved such that the moved points have the same distance to the surface of the cylinder as before.

By the method according to the present disclosure, it is possible to use the determination of a convex hull not only for filtering measurement data of an external feature of a workpiece but also for filtering measurement data of an internal feature of a workpiece. The present disclosure therefore provides a convex hull based filtration method that is usable for one or more internal features of a workpiece and thus advantageously enables to unify the filtration method for both internal and external features of a workpiece.

In a preferred embodiment, providing a measurement data set comprises capturing measurement data (and/or measurement points comprised in the measurement data) by means of a coordinate measuring device or coordinate measuring machine. The coordinate measuring device may be based on a tactile measurement, e.g. a touch trigger measurement. In addition or alternatively, the coordinate measuring device may be based on an optical measurement. In addition or alternatively, the coordinate measuring device may be based on a computer tomography measurement. In particular, the coordinate measuring device may be a tactile coordinate measuring machine, an optical measuring apparatus, a computer tomograph, or a combination thereof.

In a further preferred embodiment, the auxiliary feature is a predetermined ideal feature being defined based on design data of the internal feature and/or design data of the workpiece. In other words, the auxiliary feature may represent an ideal internal feature of the workpiece. For example, the design data may comprise or be CAD-data of the internal feature and/or the workpiece.

In a further preferred embodiment, the auxiliary feature is a Gaussian feature being determined based on the measurement data set. The "Gaussian feature" (also referred to as a geometric compensation element according to Gauβ) is a geometric element which is determined or calculated, based on the measurement data, by the well-known least squares method. According to this method, the sum of the squared distances with respect to an ideal geometry (e.g. a circle, a sphere, a cylinder or a cone) of all measurement points is minimized The ideal geometry may be a specified ideal geometry, i.e., the ideal geometry may be predetermined or determinable.

In a further preferred embodiment, the auxiliary feature is a circle, a sphere, a cylinder or a cone. It is to be understood, however, that the auxiliary feature may generally be any geometric element (particularly in 2D or 3D) that can be described or defined mathematically.

In a further preferred embodiment, the step of mirroring each measurement point of the measurement data set on a boundary element of the auxiliary feature (i.e. the first mirroring step) comprises:

for each measurement point, defining a corresponding first reflect point on the boundary element of the auxiliary feature;

for each measurement point, determining a corresponding first distance between the measurement point and the corresponding first reflect point; and generating the first modified data set by determining, for each measurement point, a mirrored measurement point, wherein the mirrored measurement point is obtained by moving the measurement point across the corresponding first reflect point by two times of the determined corresponding first distance.

The corresponding first reflect points are particularly defined for the first mirroring step. The mirrored measurement points correspond to the first modified measurement points.

For each measurement point, the corresponding first reflect point may be defined such that:
the corresponding first reflect point is located on the boundary element of the auxiliary feature, and
a virtual line between the measurement point and the corresponding first reflect point is perpendicular with respect to a tangent line or a tangent plane of the auxiliary feature at the corresponding first reflect point.

Whether the virtual line between the measurement point and the corresponding first reflect point is perpendicular with respect to a tangent line or with respect to a tangent plane depends on the dimension of the auxiliary feature. In case that the auxiliary feature is two-dimensional, the virtual line between the measurement point and the corresponding first reflect point is perpendicular with respect to a tangent line. And in case that the auxiliary feature is three-dimensional, the virtual line between the measurement point and the corresponding first reflect point is perpendicular with respect to a tangent plane.

In a further preferred embodiment, the step of projecting the points of the first modified data set onto the determined convex hull is performed orthogonally to the convex hull. In other words, the projection is performed such that each point of the first modified data set (i.e. each first modified measurement point) is moved along a line that is perpendicular to the convex hull until it reaches the convex hull. Alternatively or in addition, projecting the points of the first modified data set onto the determined convex hull is performed in radial direction from a center or an axis of the auxiliary feature. In other words, the projection is performed such that each point of the first modified data set (i.e. each first modified measurement point) is moved from a center (particularly if the auxiliary feature is a circle or a sphere) or an axis (particularly if the auxiliary feature is a cylinder or a cone) of the auxiliary feature in a radial direction of the auxiliary feature until the moved point reaches the convex hull.

In a further preferred embodiment, the step of mirroring each second modified measurement point of the second modified data set on the boundary element of the auxiliary feature comprises:

for each second modified measurement point, defining a corresponding second reflect point on the boundary element of the auxiliary feature;

for each second modified measurement point, determining a corresponding second distance between the second modified measurement point and the corresponding second reflect point; and generating the filtered measurement data set by determining, for each second modified measurement point, a back-mirrored point, wherein the back-mirrored point is obtained by moving the second modified measurement point across the corresponding second reflect point by two times of the determined corresponding second distance.

The corresponding second reflect points are particularly defined for the second mirroring step. The corresponding second reflect point may correspond to the corresponding first reflect point. The back-mirrored points correspond to the filtered measurement points.

In a further preferred embodiment, for each second modified measurement point, the corresponding second reflect point is defined such that:
the corresponding second reflect point is located on the boundary element of the auxiliary feature, and
a virtual line between the second modified measurement point and the corresponding second reflect point is perpendicular with respect to a tangent line or a tangent plane of the auxiliary feature at the corresponding second reflect point.

Whether the virtual line between the measurement point and the corresponding second reflect point is perpendicular with respect to a tangent line or with respect to a tangent plane depends on the dimension of the auxiliary feature. In case that the auxiliary feature is two-dimensional, the virtual line between the second modified measurement point and the corresponding second reflect point is perpendicular with respect to a tangent line. And in case that the auxiliary feature is three-dimensional, the virtual line between the second modified measurement point and the corresponding second reflect point is perpendicular with respect to a tangent plane.

In a further preferred embodiment, the method further comprises specifying and/or verifying the internal feature of the workpiece based on the filtered measurement data set and/or the filtered measurement points.

In a further preferred embodiment, specifying and/or verifying the internal feature of the workpiece comprises determining, based on the filtered measurement data set, a least squares geometric element (Gaussian-element). The determined least squares geometric element may be the measured specification of the internal feature. In particular, the determined least squares geometric element may be compared with a predefined ideal internal feature and/or with design data of the internal feature and/or design data of the workpiece. For example, the design data may comprise or be CAD-data of the internal feature and/or the workpiece. By the above mentioned comparing step, a verification of the internal feature may be carried out. In particular, by the above mentioned comparing step, it may be verified whether the internal feature of the investigated or measured workpiece is within predetermined tolerances.

The method according to the disclosure particularly relates to a computer implemented method. Accordingly, a computer with a processor, a memory and a display may be provided in order to carry out the method according to the disclosure. More particularly, a computer or a computer system may be provided that includes a processor that may implement or execute machine readable instructions performing some or all of the methods, functions and other processes described herein. Commands and data from the processor are communicated over a communication bus. The computer or the computer system may also include a main memory, such as a random access memory (RAM), where the machine readable instructions and data for the processor may reside during runtime, and a secondary data storage, which may be non-volatile and stores machine readable instructions and data. The memory and data storage are examples of computer readable mediums.

According to a further aspect of the present disclosure, a computer program product is provided, the computer program product comprising computer-readable instructions, which, when loaded into a memory of a computer and executed by the computer, cause the computer to perform a method according to the disclosure. In particular, the computer program product may relate to a program that is stored on a computer readable medium. Alternatively, the computer program product may relate to the computer readable medium that stores the program or a corresponding program code including the computer-readable instructions.

For the above mentioned further independent aspects and in particular for preferred embodiments in this regard, the explanations given above or below concerning the embodiments of the first aspect also hold true. In particular, for one independent aspect of the present disclosure and for preferred embodiments in this regard, the explanations given above and below concerning the embodiments of the respective other aspects also hold true.

Individual embodiments for solving the problem are described by way of example below with reference to the figures. In this case, the individual embodiments described have in part features which are not absolutely necessary for implementing the claimed subject matter, but which provide desired properties in specific applications. In this regard embodiments which do not have all the features of the embodiments described below are also intended to be regarded as disclosed in a manner coming under the technical teaching described. Furthermore, in order to avoid unnecessary repetitions, specific features are mentioned only with regard to individual embodiments from among the embodiments described below. It is pointed out that the individual embodiments are therefore intended to be considered not only by themselves but also in a joint consideration. On the basis of this joint consideration the person skilled in the art will recognize that individual embodiments can also be modified by inclusion of individual or a plurality of features of other embodiments. It is pointed out that a systematic combination of the individual embodiments with individual or a plurality of features described with regard to other embodiments may be desirable and expedient and is therefore intended to be taken into account and also to be regarded as encompassed by the description.

BRIEF DESCRIPTION OF THE DRAWINGS

The above and other objects, features and advantages of the present disclosure will become more apparent upon reading of the following description of preferred embodiments and accompanying drawings. Other features and advantages of the subject-matter described herein will be apparent from the description and the drawings and from the claims. It should be understood that even though embodiments are separately described, single features and functionalities thereof may be combined without prejudice to additional embodiments. The present disclosure is illustrated by way of example and not limited by the accompanying figures.

Preferred embodiments of the present disclosure are exemplarily described regarding the following figures:

FIG. 1a shows a schematic representation of an exemplified workpiece having an internal feature and a corresponding counterpart of the workpiece, wherein the corresponding counterpart has an external feature that corresponds to the internal feature of the workpiece;

FIG. 1b shows a schematic representation illustrating a filtration that shall be applied to a nominal flat surface of an outer feature according to the ISO 5459:2011 standard;

FIG. 1c shows a schematic representation illustrating a filtration that shall be applied to a nominally cylindrical surface of an inner feature according to the ISO 5459:2011 standard;

DETAILED DESCRIPTION OF THE DISCLOSURE

Figure 2:
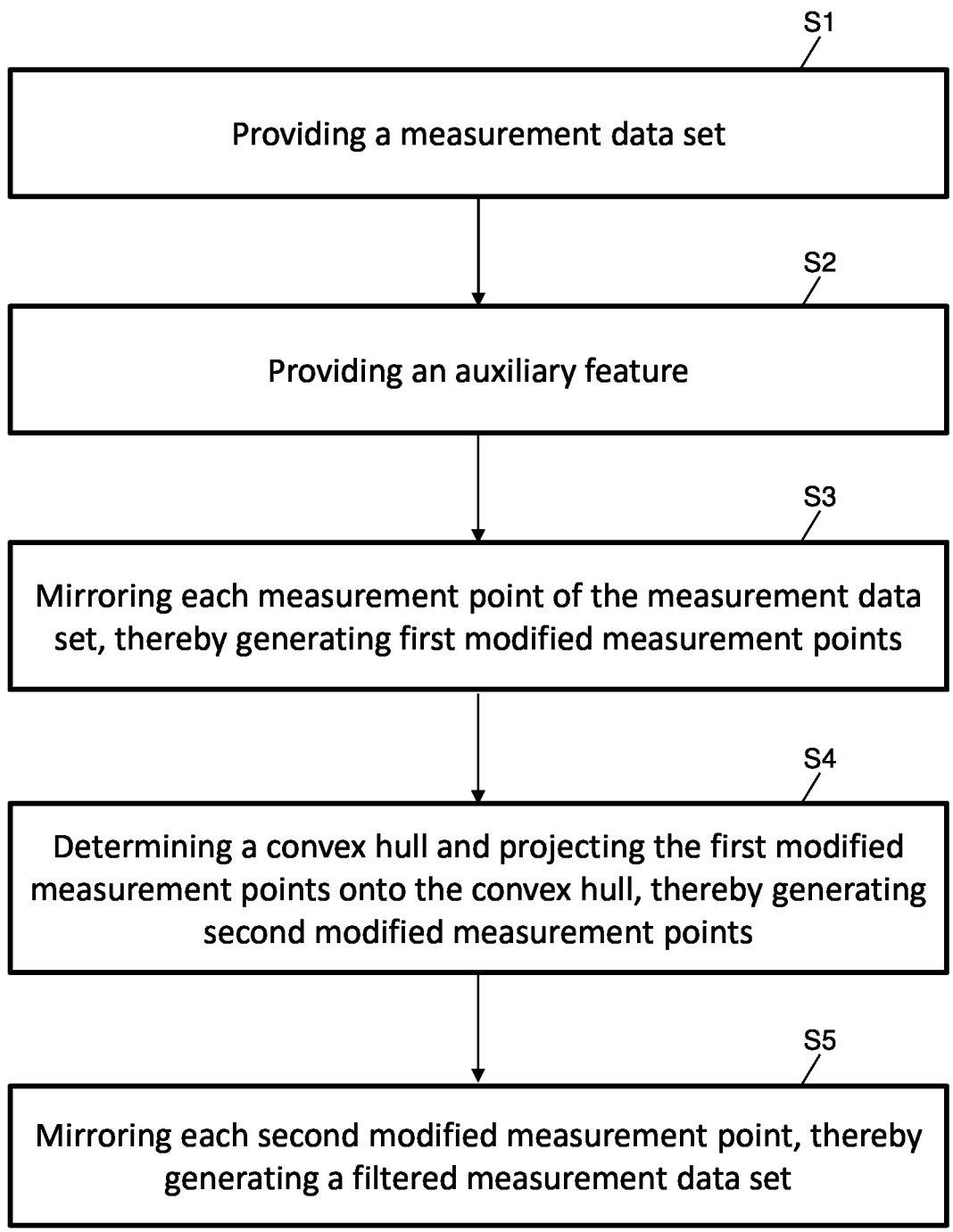
FIG. 2 shows a flow diagram of the method according to a preferred embodiment of the present disclosure.

The particulars shown herein are by way of example and for purposes of illustrative discussion of the embodiments of the present invention only and are presented in the cause of providing what is believed to be the most useful and readily understood description of the principles and conceptual aspects of the present invention. In this regard, no attempt is made to show structural details of the present invention in more detail than is necessary for the fundamental understanding of the present invention, the description taken with the drawings making apparent to those skilled in the art how the forms of the present invention may be embodied in practice.

Referring to the drawings wherein like characters represent like elements, FIG. 1a shows a schematic representation of an exemplified workpiece 100 having an internal or inner feature 10 (being a bore in the shown example), as well as a corresponding counterpart 200 of the workpiece 100. The corresponding counterpart 200 has an external or outer feature 20 (being a bolt in the shown example) that corresponds to the internal feature 10 of the workpiece 100. The functional need of workpiece 100 is to assemble it with counterpart 200. The planar surface 2 of counterpart 200 with bolt 20 must fit to the corresponding bore 10 and the planar surface 1 of workpiece 100.

A functional demand for specification may be to characterize the planar surface 1 of workpiece 100 to be perpendicular to the bore 20 of counterpart 200. In this case, the bore 10, geometrically a cylinder, serves as datum.

In order to verify such a specification, a first step may be to determine the datum. Therefore, the workpiece 100 may be placed on a coordinate measuring machine (not shown in FIG. 1) in order to capture measurement points from the inside of the bore 10 (e.g. by touching from the inside with a probe). These measurement points shall geometrically represent the bore 10 as cylinder. According to the current ISO 5459:2011 standard, the measurement points are used to determine an optimal cylinder of perfect form with maximum diameter that fits into the bore 10. That means that all measurement points have to be outside of the cylinder. The calculated cylinder (associated cylinder) serves as datum.

In order to capture the measurement points, different methods using a coordinate measuring machine (CMM) like scanning, touch trigger, etc. may be used. Alternatively or in addition, an optical measuring machine and/or a computer tomography (X-ray) based machine may be used. Any method entails the probability that some measurement points are outliers and do not reflect the real surface. Therefore, ISO 5459:2011 Appendix A states that a filtration step needs to be performed before calculation of the associated cylinder. But it does not explicitly specify which filter to be used.

FIG. 1b shows a schematic representation that illustrates how a filtration should generally look like according to the ISO 5459:2011 standard with respect to an outer feature 20. In the example shown, which corresponds to figure A.3 of appendix A of ISO 5459:2011 standard, the outer feature has a nominal flat surface. The continuous black line 3 in FIG. 1b represents the real integral feature, whereas the dashed line 4 represents the filtered feature.

FIG. 1c shows a schematic representation that illustrates how a filtration should generally look like according to the ISO 5459:2011 standard with respect to an inner feature 10. In the example shown, which corresponds to figure A.3 of appendix A of ISO 5459:2011 standard, the inner feature 10 has a nominally cylindrical surface. Like in FIG. 1b, the continuous black line 3 in FIG. 1c represents the real integral feature, whereas the dashed line 4 represents the filtered feature.

As already mentioned above, for outer features like the bolt 20 of FIG. 1a, it is known to filter the measurement points by determining a convex hull of the measurement points. More specifically, the general procedure for filtering an outer feature can be described as follows: For measurement points {P}, find the convex hull and project the points onto the convex hull resulting in points {P*}, wherein points {P*} represent the filtered points. In view of inner features, like the bore 1 of workpiece 100 shown in FIG. 1a, however, a convex hull based filter with the same conditions was not known up to now. The present disclosure closes this gap and provides a filtration method that is applicable to inner features of a workpiece and that is also a convex hull based filtration method. Thus, the present disclosure enables the possibility of unifying the filtration method over inner and outer features.

FIG. 2 shows a flow diagram of a method for filtering a measurement data set usable for specifying and/or verifying an internal feature 10 of a workpiece 100 according to a preferred embodiment of the present disclosure. In a step S1, a measurement data set comprising a plurality of measurement points of the internal feature is provided. In a step S2, an auxiliary feature which represents an ideal estimate for the internal feature of the workpiece is provided. In a step S3, each measurement point of the measurement data set is mirrored on a boundary element of the auxiliary feature, thereby generating a first modified data set comprising a plurality of first modified measurement points. In a step S4, a convex hull of the first modified measurement points is determined and the first modified measurement points are projected onto the determined convex hull, thereby generating a second modified data set comprising a plurality of second modified measurement points. And in a step S5, each second modified measurement point is mirrored on the boundary element of the auxiliary feature, thereby generating a filtered measurement data set comprising a plurality of filtered measurement points.

In particular, a measurement data set is provided and a filtered measurement data set is generated as an output. The filtered measurement data set is the result of a smoothening process. For this smoothening process, an auxiliary feature (i.e. an auxiliary geometric element), e.g. a least squares cylinder, is provided (particularly calculated). The distances of measurement points to this auxiliary feature are the values to be smoothened. After smoothening these distance values, the original measurement points are moved from the original distance (with respect to the auxiliary geometric element) to the smoothened distance value. This results in a filtered set of points. Generally, every point of the measurement data has influence on the calculation of an associated feature (e.g. an associated cylinder). In particular, for a least squares based association, measurement points with larger distances with respect to the auxiliary feature have more impact on the result. To avoid that irrelevant measurement points (so-called "outliers") influence the result, the filtration is performed. For example, such a filtration has a similar effect as if the peaks on a bolt are mechanically removed by shifting a gauge (bore) on the bolt. Therefore, a filtration method as provided by the present disclosure may replace a mechanical check (which is expensive, cumbersome and time-consuming) by a cheap, simple, and fast measurement combined with an algorithmic calculation.

In particular, measurement points of inner features of a workpiece are reduced to outer features by mirroring the measured points at a reference feature, applying a convex hull filter on the outer feature and mirroring back the result. This preserves properties of the convex hull for outer features also for inner features (e.g. preserving high point). It is well known that convex hull is not directly applicable for inner features. The disclosure, however, makes it possible to apply the convex hull also for inner features. So inner and outer features can be filtered by the same filter type.

Figure 3A:
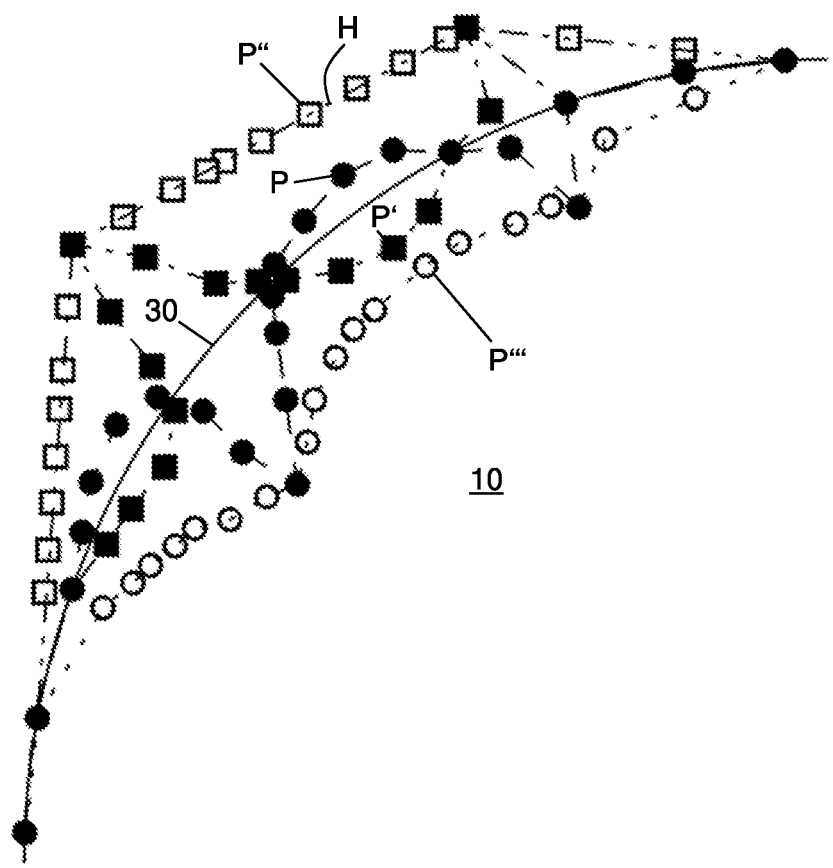
FIG. 3a shows a sketch that illustrates the method according to the disclosure by means of a first example.
Figure 3B:
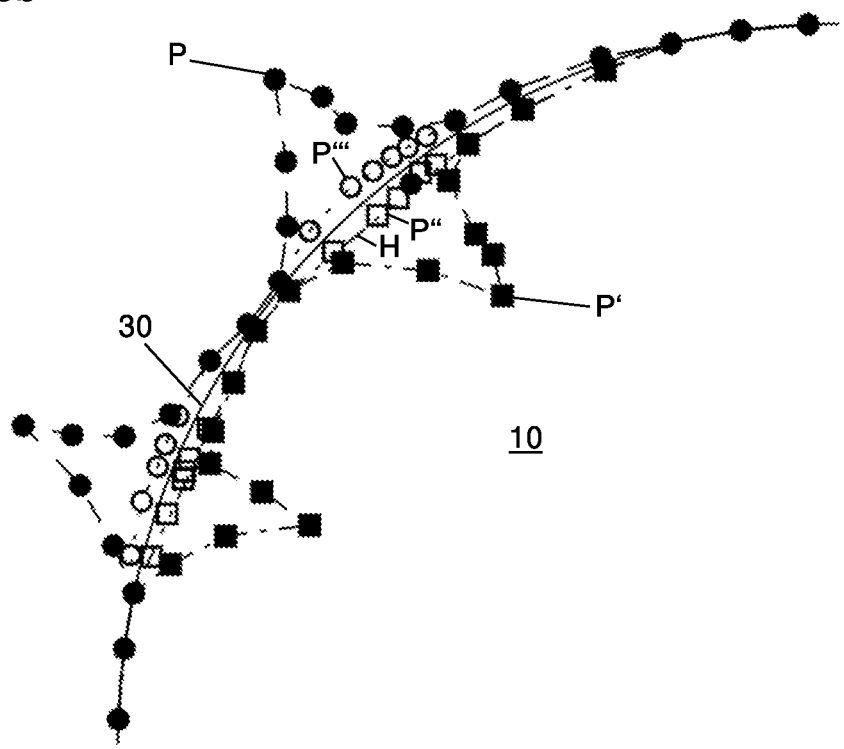
FIG. 3b shows a sketch that illustrates the method according to the disclosure by means of a second example.
Figure 4:
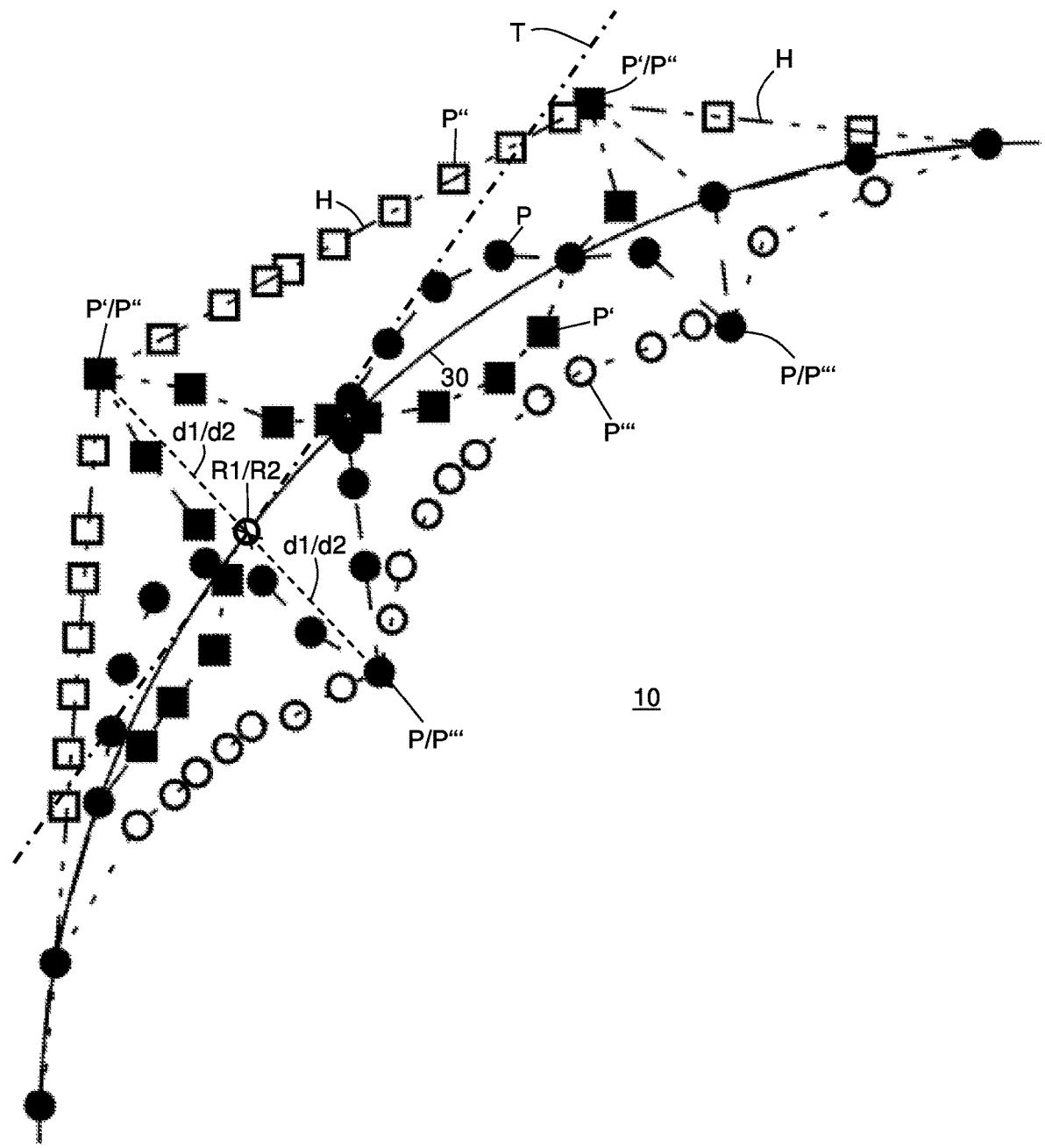
FIG. 4 shows a blow-up of the sketch of FIG. 2a for illustrating further details of the method according to a preferred embodiment.

In FIGS. 3a and 3b the principle of the present disclosure is illustrated by way of two different examples. More specifically, FIG. 3a illustrates an inner-feature filtering process for measurement points with two extreme peaks to the inside of an inner feature 10 of a workpiece to be measured. And FIG. 3b illustrates an inner-feature filtering process for measurement points with two extreme peaks to the outside of the inner feature 10 to be measured. In both examples, the inner feature 10 has a circular shape, and thus the auxiliary feature 30 is a circle. In FIGS. 3a and 3b, the straight circular line represents a portion of the auxiliary feature 30, particularly a portion of the boarder element of the auxiliary feature 30. Accordingly, it is noted that only a part of the inner feature 10 and the auxiliary feature 30 are shown or indicated in FIGS. 3a and 3b. The points with reference number P are the measurement points obtained from a coordinate measuring device, the points with reference number P' are mirrored measurement points, the points with reference number P'' are points projected on a convex hull H, and the points with reference number P''' are mirrored points of the convex hull H. Accordingly, the measurement points P form the measurement data set, the mirrored measurement points P' form the first modified data set, the projected points P'' form the second modified data set, and points P''' (also referred to as the filtered measurement points) form the third modified data set (also referred to as the filtered data set). In FIGS. 3a, 3b and 4, the measurement points P are represented by filled circles (disks) while the corresponding continuous contour is represented by a dashed line, the mirrored measurement points P' are represented by filled squares (boxes) while the corresponding continuous contour is represented by a dashed dotted line, the projected points P'' are represented by empty squares while the corresponding continuous contour is represented by a dashed dot dotted line, and points P''' are represented by empty circles while the corresponding continuous contour is represented by a dotted line.

As already mentioned above with respect to FIG. 2, a measurement data set comprising a plurality of measurement points P of the internal feature 10 is provided, particularly measured by using a coordinate measuring device. In particular, the measurement points P are coordinates of the inner feature 10. An auxiliary feature 30 which represents an ideal estimate for the internal feature 10 of the workpiece 100 is provided. Then, each measurement point P of the measurement data set is mirrored on a boundary element of the auxiliary feature 30 which in the example shown in FIGS. 3a and 3b is a circle. By this first mirroring step, a first modified data set comprising a plurality of first modified measurement points P' is generated. Based on these first modified measurement points P' a convex hull H is determined or calculated by means of a convex hull algorithm and the first modified measurement points P' are projected onto the determined convex hull H, thereby generating a second modified data set comprising a plurality of second modified measurement points P''. Each second modified measurement point P'' is thus located on the determined convex hull H. Subsequently, each second modified measurement point P'' is mirrored on the boundary element of the auxiliary feature 30. By this second mirroring step, a filtered measurement data set comprising a plurality of filtered measurement points P''' is generated. As can be seen from FIGS. 3a and 3b, the filtered measurement data set with filtered measurement points P''' is a smoothened data set which is based on the measurement data set with measurement points P.

Both examples shown in FIGS. 3a and 3b illustrate the behavior of the inner-feature filter, wherein the following properties required for a filter with respect to inner features are satisfied:

outlier to the outside of the feature are eliminated, because they should have less influence on the datum association process;

innermost points are kept, because these are the relevant points for calculation the datum association; and the filter behaves similar to a morphological filter, i.e., smoothens the deviations, which is required to be a candidate for a default filtering process.

It is noted that the sketches of FIGS. 3a and 3b serve for illustration only and do not show the exact positions of the actual calculated points.

FIG. 4 shows a blow-up of the sketch of FIG. 3a for illustrating further details of the method according to a preferred embodiment. In particular, according to a preferred embodiment, the following steps define a convex hull based method for inner features:

mirroring every point P of the measurement data set {P} at an auxiliary feature to obtain a first modified data set {P'};

for the first modified data set {P'}, find the convex hull and project the points P' of the first modified data set {P'} onto the convex hull resulting in a second modified data set {P''}, wherein the projection can be performed orthogonally to the convex hull or in radial direction from the center/axis of the auxiliary feature; and mirroring every point P'' of the second modified data set {P''} at the auxiliary feature to obtain a third modified data set {P'''}, wherein the points P''' of the third modified data set {P'''} are the filtered points.

The auxiliary feature 30 may be a predetermined ideal feature being defined based on design data of the internal feature 10 and/or design data of the workpiece 100. Alternatively, the auxiliary feature 30 may be a Gaussian feature being determined based on the measurement points P.

For each measurement point P, a corresponding first reflect point R1 on the boundary element of the auxiliary feature 30 is defined. The corresponding first reflect point R1 is located on the boundary element of the auxiliary feature 30. Further, the corresponding first reflect point R1 is defined such that a virtual line between the measurement point P and the corresponding first reflect point R1 is perpendicular with respect to a tangent line or tangent plane T of the auxiliary feature 30 at the corresponding first reflect point R1. Moreover, for each measurement point P, a corresponding first distance d1 between the measurement point P and the corresponding first reflect point R1 is defined.

The first modified data set is generated by determining, for each measurement point P, a mirrored measurement point, wherein the mirrored measurement point is obtained by moving the measurement point P across the corresponding first reflect point R1 by two times of the determined corresponding first distance d1.

For each second modified measurement point P''', a corresponding second reflect point R2 on the boundary element of the auxiliary feature 30 is defined. Like the first reflect point R1, also the corresponding second reflect point R2 is located on the boundary element of the auxiliary feature 30. Further, the corresponding second reflect point R2 is defined such that a virtual line between the second modified measurement point P'' and the corresponding second reflect point R2 is perpendicular with respect to a tangent line or tangent plane T of the auxiliary feature 30 at the corresponding second reflect point R2. Moreover, for each second modified measurement point P'', a corresponding second distance d2 between the second modified measurement point P'' and the corresponding second reflect point R2 is determined.

The filtered measurement data set is then generated by determining, for each second modified measurement point P'', a back-mirrored point, wherein the back-mirrored point is obtained by moving the second modified measurement point P'' across the corresponding second reflect point R2 by two times of the determined corresponding second distance d2.

In FIG. 4, P/P''' means that measurement point P and filtered measurement point P''' are super-imposed. Correspondingly, P'/P'' means that first modified measurement point P' and second modified measurement point P'' are super-imposed. Further, R1/R2 means that the first reflect point R1 and the second reflect point R2 are super-imposed. In other words, R1/R2 means that the second reflect point R2 corresponds to the first reflect point R1. And d1/d2 means that the first distance d1 and the second distance d2 are equal. In other words, d1/d2 means that the second distance d2 corresponds to the first distance d1. It is noted that such a configuration, i.e. a configuration where points P and P''', as well as points P' and P'', are super-imposed, only applies for points that are based on the innermost measurement points.

Figure 5:
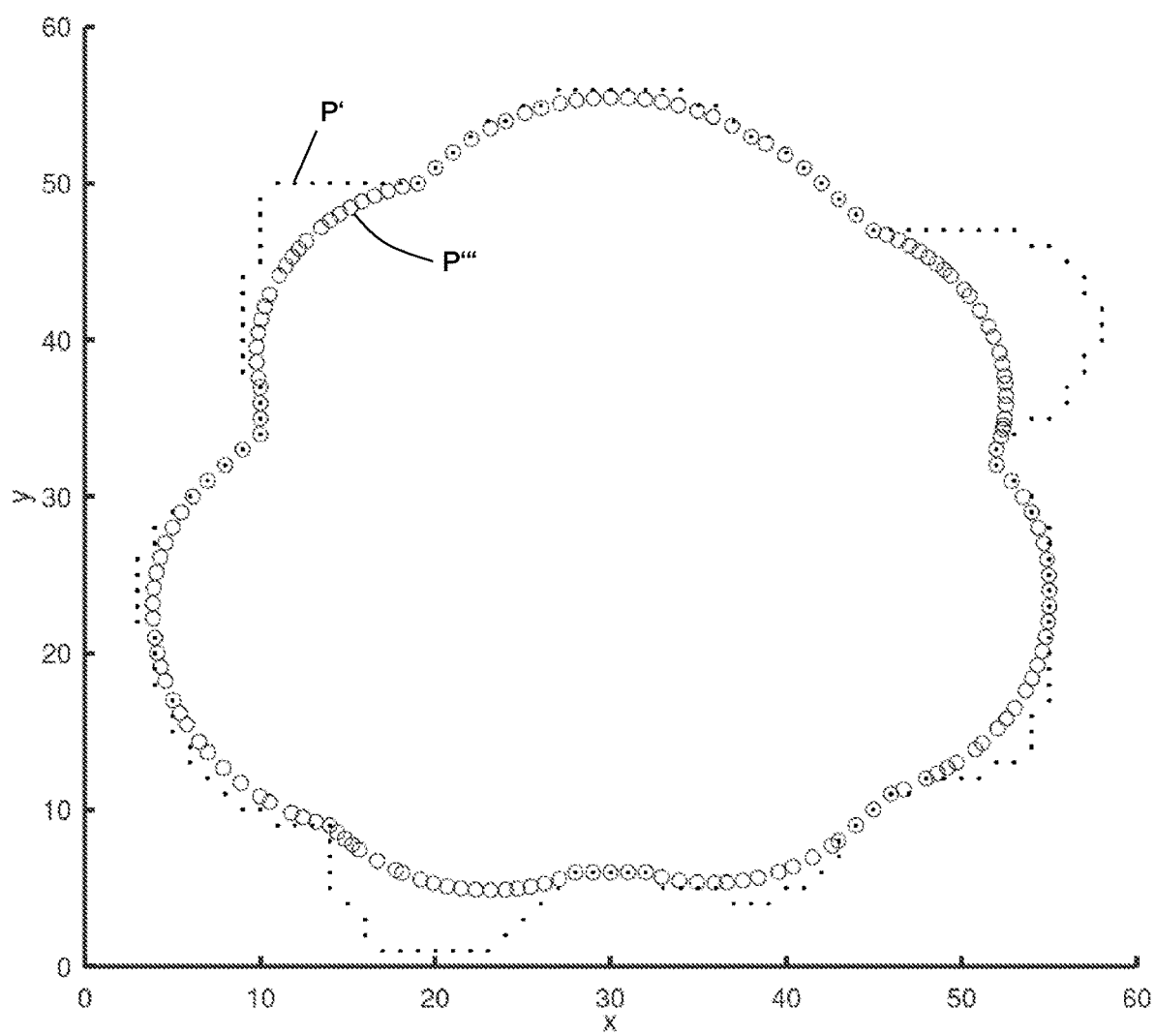
FIG. 5 shows measurement points and filtered points of an internal feature of a workpiece according to a first example.
Figure 6:
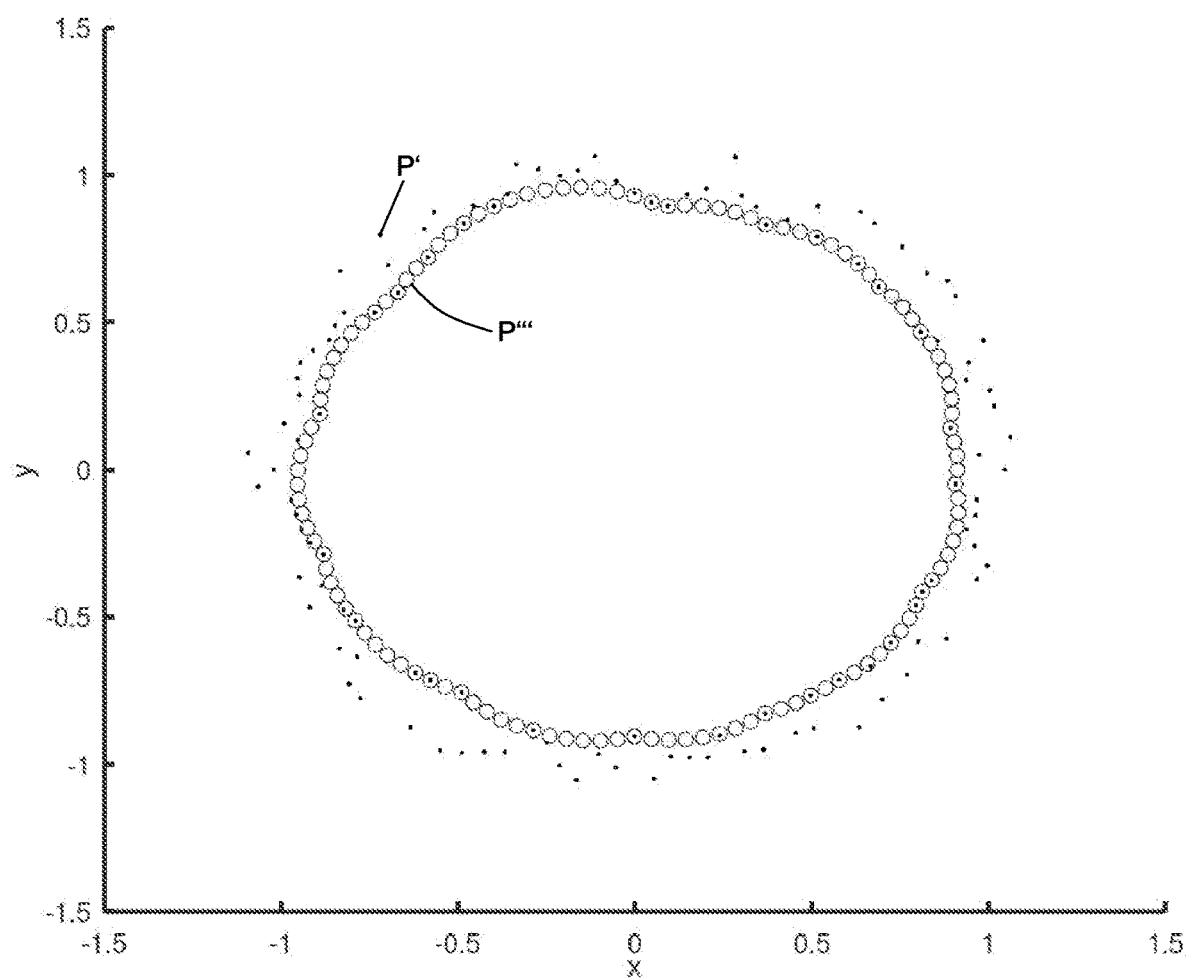
FIG. 6 shows measurement points and filtered points of an internal feature of a workpiece according to a second example.

FIGS. 5 and 6 show exemplified results of the implementation of the convex hull based filtration method for inner-features according to the disclosure. More specifically, FIG. 5 shows measurement points P (represented as black dots) and filtered points P''' (represented as empty circles) of an internal feature of a workpiece according to a first example, wherein the contour of the internal feature corresponds to the example disclosed in figure A.3 of appendix A of the ISO 5459:2011 standard (see FIG. 1c). And FIG. 6 shows measurement points P (represented as black dots) and filtered points P''' (represented as empty circles) of an internal feature of a workpiece according to a second example, wherein the contour of the internal feature is a circle with random deviation. In particular, based on the measurement points P of the circle feature, the filter mirrors every measurement point P in radial direction at a reference circle, applies the convex hull on these points, projects the points on the convex hull and finally mirrors back these points. It is noted that the results obtained by using the method according to the present disclosure comply with figure A.3 of appendix A of the ISO 5459:2011 standard (see FIG. 1c), which illustrates how a filtered profile should look like.

It is noted that the foregoing examples have been provided merely for the purpose of explanation and are in no way to be construed as limiting of the present invention. While the present invention has been described with reference to exemplary embodiments, it is understood that the words which have been used herein are words of description and illustration, rather than words of limitation. Changes may be made, within the purview of the appended claims, as presently stated and as amended, without departing from the scope and spirit of the present invention in its aspects. Although the present invention has been described herein with reference to particular structures, materials and embodiments, the present invention is not intended to be limited to the particulars disclosed herein; rather, the present invention extends to all functionally equivalent structures, methods and uses, such as are within the scope of the appended claims.

The present invention is not limited to the above described embodiments, and various variations and modifications may be possible without departing from the scope of the present invention.

What is claimed is:

1. A method for filtering a measurement data set usable for either or both of specifying or verifying an internal feature of a workpiece, the method comprising:
   providing a measurement data set comprising a plurality of measurement points of the internal feature;
   providing an auxiliary feature which represents an ideal estimate for the internal feature of the workpiece;
   mirroring each measurement point of the measurement data set on a boundary element of the auxiliary feature, such that a first modified data set comprising a plurality of first modified measurement points is generated;
   determining a convex hull of the first modified measurement points and projecting the first modified measurement points onto the determined convex hull, such that a second modified data set comprising a plurality of second modified measurement points is generated; and
   mirroring each second modified measurement point on the boundary element of the auxiliary feature, such that a filtered measurement data set comprising a plurality of filtered measurement points is generated.

2. The method according to claim 1, wherein the providing of the measurement data set comprises capturing measurement data by a coordinate measuring device.

3. The method according to claim 1, wherein one of:
   the auxiliary feature is a predetermined ideal feature being defined based on either or both of design data of the internal feature or design data of the workpiece; or
   wherein the auxiliary feature is a Gaussian feature being determined based on the measurement data set.

4. The method according to claim 1, wherein the auxiliary feature is a circle, a sphere, a cylinder or a cone.

5. The method according to claim 1, wherein the mirroring of each measurement point of the measurement data set on a boundary element of the auxiliary feature comprises:
   defining, for each measurement point, a corresponding first reflect point on the boundary element of the auxiliary feature;
   determining, for each measurement point, a corresponding first distance between the measurement point and the corresponding first reflect point; and
   generating the first modified data set by determining, for each measurement point, a mirrored measurement point, wherein the mirrored measurement point is obtained by moving the measurement point across the corresponding first reflect point by two times the determined corresponding first distance.

6. The method according to claim 5, wherein for each measurement point, the corresponding first reflect point is defined such that:
   the corresponding first reflect point is located on the boundary element of the auxiliary feature, and
   a virtual line between the measurement point and the corresponding first reflect point is perpendicular with respect to a tangent line or a tangent plane of the auxiliary feature at the corresponding first reflect point.

7. The method according to claim 1, wherein projecting the first modified measurement points of the first modified data set onto the determined convex hull is performed either or both of:
orthogonally to the convex hull; or
in radial direction from a center or an axis of the auxiliary feature.

8. The method according to claim 1, wherein mirroring each second modified measurement point of the second modified data set on the boundary element of the auxiliary feature comprises:
defining, for each second modified measurement point, a corresponding second reflect point on the boundary element of the auxiliary feature;
determining, for each second modified measurement point, a corresponding second distance between the second modified measurement point and the corresponding second reflect point; and
generating the filtered measurement data set by determining, for each second modified measurement point, a back-mirrored point, wherein the back-mirrored point is obtained by moving the second modified measurement point across the corresponding second reflect point by two times of the determined corresponding second distance.

9. The method according to claim 8, wherein:
the mirroring of each measurement point of the measurement data set on a boundary element of the auxiliary feature comprises:
defining, for each measurement point, a corresponding first reflect point on the boundary element of the auxiliary feature;
determining, for each measurement point, a corresponding first distance between the measurement point and the corresponding first reflect point, and
generating the first modified data set by determining, for each measurement point, a mirrored measurement point, wherein the mirrored measurement point is obtained by moving the measurement point across the corresponding first reflect point by two times the determined corresponding first distance;
for each measurement point, the corresponding first reflect point is defined such that:
the corresponding first reflect point is located on the boundary element of the auxiliary feature, and
a virtual line between the measurement point and the corresponding first reflect point is perpendicular with respect to a tangent line or a tangent plane of the auxiliary feature at the corresponding first reflect point; and
the corresponding second reflect point corresponds to the corresponding first reflect point.

10. The method according to claim 8, wherein for the second modified measurement point of the second modified data set, the corresponding second reflect point is defined such that:
the corresponding second reflect point is located on the boundary element of the auxiliary feature, and
a virtual line between the second modified measurement point and the corresponding second reflect point is perpendicular with respect to a tangent line or a tangent plane of the auxiliary feature at the corresponding second reflect point.

11. The method according to claim 1, further comprising:
either or both of specifying or verifying the internal feature of the workpiece based on the filtered measurement data set.

12. The method according to claim 11, wherein the either or both of specifying or verifying the internal feature of the workpiece comprises determining, based on the filtered measurement data set, a least squares geometric element.

13. At least one tangible, non-transitory computer-readable medium storing an executable set of instructions for filtering a measurement data set usable for either or both of specifying or verifying an internal feature of a workpiece, wherein the set of instructions, when executed by a computer processor, causes the computer processor to execute operations comprising:
providing a measurement data set comprising a plurality of measurement points of the internal feature;
providing an auxiliary feature which represents an ideal estimate for the internal feature of the workpiece;
mirroring each measurement point of the measurement data set on a boundary element of the auxiliary feature, such that a first modified data set comprising a plurality of first modified measurement points is generated;
determining a convex hull of the first modified measurement points and projecting the first modified measurement points onto the determined convex hull, such that a second modified data set comprising a plurality of second modified measurement points is generated; and
mirroring each second modified measurement point on the boundary element of the auxiliary feature, such that a filtered measurement data set comprising a plurality of filtered measurement points is generated.

* * * * *